United States Patent Office

3,637,872
Patented Jan. 25, 1972

1

3,637,872
DEHYDROCHLORINATION PROCESS
Sidney Berkowitz, Highland Park, N.J., assignor to
FMC Corporation, New York, N.Y.
No Drawing. Filed June 3, 1968, Ser. No. 733,787
Int. Cl. C07c 21/04
U.S. Cl. 260—654 D                              3 Claims

ABSTRACT OF THE DISCLOSURE

Polychlorinated hydrocarbons are dehydrochlorinated by being contacted with one or both of sodium chloride and potassium chloride in particulate form and in the presence of a trace amount of chlorine or oxygen at a temperature of 300° C. to 600° C., to provide unsautrated, chlorinated hydrocarbons.

BACKGROUND OF THE INVENTION

Unsaturated chlorinated hydrocarbons such as vinyl chloride, vinylidene chloride, trichloroethylene and perchloroethylene are important commercial products. Vinyl chloride and vinylidene chloride are precursors to useful polymers, while tri- and per- chloroethylenes are widely used as solvents, degreasing agents and the like.

Several methods are known for producing the unsaturated, chlorinated hydrocarbons. One of these is dehydrochlorination, in which a precursor having more chlorine than is desired in the product is treated for removal of hydrogen chloride. In this process the precursor is heated to an elevated temperature, genearlly from 200° to 600° C., and the resulting unsaturtaed chlorinated hydrocarbon is separated from byproduct hydrogen chloride. In many instances, this process is potentially the most economical route to the desired product.

The dehydrochlorination reaction is normally quite inefficient, however, and must be catalyzed if it is to be commercially feasible. While several useful catalysts have been devised for the process, none are completely satisfactory. Thus, some of these catalysts do not cause the reaction to proceed to sufficiently high yields, while others result in the producion of undesirable byproducts, such as polymeric tars or gums. Other catalysts which have been tried are destroyed in the process, or at best are readily deactivated, or poisoned, after use for a short time.

It therefore has remained an object of workers in the field to provide an economical, low-cost catalyst for dehydrochlorination reactions which satisfactorily promotes the desired reaction without substantial promotion of harmful side reactions or catalyst deactivation.

SUMMARY OF THE INVENTION

I have now found that sodium chloride, potassium chloride or mixtures thereof, and particularly common rock salt, having a particle size of 2 to 360 mesh, and preferably of 4 to 16 mesh, is a highly selective and effective catalyst for dehydrochlorination of polychlorinated hydrocarbons having 2 to 4 carbon atoms. The reaction is conducted by contacting the polychlorinated hydrocarbon as a vapor with the rock salt catalyst at a temperature of about 300° to 600° C. and preferably of 400° to 500° C., in the presence of a trace amount of chlorine or oxygen. The process results in the production of high yields of desired products to the essential exclusion of deleterious side products such

2 as polymeric tars or gums. Furthermore, my noted salt catalyst, which is low-cost and readily available, is highly resistant to poisoning or other degradation and can be used for extended periods without losing its activity.

DESCRIPTION OF THE INVENTION AND THE PREFERRED EMBODIMENTS

The polychlorinated hydrocarbons which are dehydrochlorinated in accordance with the process of this invention are such materials having 2 to 4 carbon atoms and having the following group:

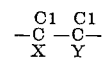

in which X is hydrogen and Y is hydrogen or chlorine. They are exemplified by 1,1,2-trichloroethane, 1,2-dichloroethane, 1,1,2,2-tetrachloroethane, pentachloroethane, 1,1,2,2-tetrachloroethane, pentachloroethane, 1,1,1-trichloroethane, 1,1,1,2-tetrachloroethane, 1,2-dichloropropane and dichlorobutanes.

The products of dehydrochlorination of these materials, or mixtures of them, of course vary depending upon the starting material. When 1,1,2-trichloroethane is dehydrochlorinated, it yields vinylidene chloride, a material useful in using polyvinylidene chloride polymers. When mixtures of chloroethanes, for example 1,2-dichloroethane and 1,1,2-trichloroethane are dehydrochlorinated in accordance with the present process, the reaction products include vinyl chloride, vinylidene chloride and cis- and trans-dichloroethylenes. It is an interesting characteristic of the present catalyst that feed mixtures of chloroethanes and chloroethenes when treated by the present process employing this catalyst selectively react only in the chloroethane molecule. It is also important that the presence of materials often associated with the polychlorinated hydrocarbons and which are known to act as inhibitors of dehydrochlorination, for example, toluene, hexane and alcohols, have no deleterious effect upon the reaction rates or product distribution when the present catalyst is employed.

The catalyst used in the reaction is one or both of sodium chloride and potassium chloride, preferably rock salt, having a particle size of 2–360 U.S. Standard Mesh, and preferably of 4–16 U.S. Standard Mesh. This catalyst is used either in a fixed bed or in a fluid bed. Particles smaller than 360 mesh tend to blow out of the reactor, whether they are used in a fixed bed or in a fluid bed, whereas particles larger than about 2 mesh are difficult to obtain and in any event have a low surface area available for contact with the reaction gases, and therefore are less effective for a given weight of catalyst. The particle size employed for particular operations, either for fixed or fluid bed are in accordance with known practice and in the case of fluid bed, normally range from 50 to 360 U.S. Standard Mesh, and in the case of fixed bed from 2 to 50 U.S. Standard Mesh.

The reaction is carried out in the presence of a trace amount of chlorine or oxygen, which act as initiators of the reaction. About 0.0001 to 0.002 mole of the gas per mole of chlorinated hydrocarbon being dehydrochlorinated is employed. Presence of more chlorine or oxygen is not harmful, up to a reasonable amount, e.g. 0.1 mole per mole of chlorinated hydrocarbon reactant, although at levels above that amount deleterious side reactions may take place. While the dehydrochlorination reaction proceeds to some extent in most instances in the absence of the initiator gas, the reaction under such conditions does not provide the high degree of effectiveness achieved when the chlorine or oxygen is present.

The temperature at which the dehydrochlorination reaction is carried out is within the range of 300° to 600° C., and preferably of 400° to 500° C. Operation at lower temperatures tends to slow the reaction unduly; it is slowed to an impractical rate in the case of most polychlorinated hydrocarbons, below about 300° C. Carrying out the reaction above about 600° C. often results in production of harmful byproducts, even when using the catalyst of this invention, and therefore is normally avoided, although with some precursors useful reaction can be carried out at temperatures moderately above 600° C.

The polychlorinated hydrocarbon is contacted with the catalyst for a length of time which is sufficient to permit the extent of reaction desired. Generally speaking the reaction proceeds quite rapidly, being completed in on the order of 0.2 to 10 seconds. The time the reaction gases are in contact with the catalyst, and therefore the reaction time, may be adjusted for example by adjusting the flow rate of the gas, the size of the chamber, the configuration and amount of catalyst and the like. Obviously longer contact times are acceptable, although largely for economic reasons as short a contact time as possible, consistent with full reaction, is desired. Normally at higher temperatures within the range of 400° to 600° C. shorter times are required than when lower temperatures within the range are employed.

The pressure at which the process of this invention is carried out is not important. It is possible to operate at ambient pressures, or pressures above or below ambient, for example as low as 300 mm. Hg or as high as 1600 mm. Hg, without harmful effect.

The products of the reaction are the desired dehydrochlorinated chlorinated hydrocarbon and hydrogen chloride, in association with some of the precursor polychlorinated hydrocarbon. Where desired the latter can be recycled after it is separated from the reaction products and hydrogen chloride. The latter may be removed by known absorption, neutralization or other means from the reaction mixture either before or after separation of the desired products from the precursor material, which is conveniently effected by distillation.

The following examples are given by way of illustration of the process of this invention only, and are not to be considered as limiting the scope thereof in any way. Where hydrocarbons are referred to as the feed in examples where no additional gases are mentioned, they were introduced with inert, nitrogen, and chlorine in the molar ratios given in Example 1.

Example 1

A 1⅛ inch outside diameter Pyrex glass tube having a length of 24 inches was charged with a 300 cc. volume of rock salt (sodium chloride) having a U.S. Standard Mesh size of 6-8. Liquid 1,1,2-trichloroethane was introduced into the vaporizer, and the resulting vapors mixed with nitrogen and chlorine in a mole ratio of the trichloroethane to nitrogen to chlorine of 1:1:0.001 and passed at 450° C. through the reactor which was heated at 450° C. A feed rate of 30 g./hr., providing a residence time of 7.5 seconds, was maintained.

The effluent gases were collected and distilled into the chlorinated hydrocarbon components and hydrogen chloride byproduct. Essentially 100% of the 1,1,2-trichloroethane was dehydrochlorinated to a 50-50 weight percent mixture of vinylidene chloride and cis- and trans-dichloroethylenes. There was no carbonization, tar formation or polymer formation in the catalyst bed or in the products.

Example 2—Comparative

This example was run with several alternate catalysts in place of the rock salt employed in Example 1 in accordance with this invention. Table 1, which follows, shows the catalyst, the reactor temperature and the amount of 1,1,2-trichloroethane converted to vinylidene chloride and the cis- and trans-dichloroethylenes. The procedure of Example 1 was followed with respect to operating conditions, except as otherwise noted.

TABLE 1

| Catalyst | Reactor temp., °C. | Conversion percent To vinylidene chloride | To by-products[1] | Total | Remarks |
|---|---|---|---|---|---|
| Sand | 450 | 12 | 60 | 72 | Carbonization and tars. |
| Do | 500 | 12 | 79 | 91 | Do. |
| Silica gel | 450 | 15 | 60 | 75 | Do. |
| Activated carbon | 450 | 2 | 77 | 79 | Do. |
| Gamma alumina | 450 | Trace | 89 | 89 | Do. |
| Silica magnesia | 450 | Trace | 60 | 60 | Do. |
| Silica carbide | 450 | Trace | 60 | 60 | Do. |
| Celite type V | 450 | Trace | 75 | 75 | Do. |
| Graphite | 450 | 4 | 60 | 64 | Do. |
| Mulnorite | 450 | 15 | 60 | 75 | Do. |
| Silica magnesia plus 10% $CuCl_2$ | 450 | Trace | 85 | 85 | Do. |

[1] Cis- and trans-dichloroethylenes and other chlorinated hydrocarbon byproducts. Desired product was vinylidene chloride, a precursor to useful polymers.

Example 3

The procedure of Example 1 was followed, employing rock salt as the catalyst in dehydrochlorinating 1,2-dichloroethane. A comparative run, in the absence of catalyst, was also carried out and the results of the two experiments are shown in following Table 2. Here the desired product was vinyl chloride, which is a useful polymer-forming monomer.

TABLE 2

| Catalyst | Reactor temp., °C. | Conversions to vinyl chloride, percent | Remarks |
|---|---|---|---|
| None | 400 | 15 | Some carbonization. |
| Rock salt | 400 | 80 | No carbonization or tars. |

Example 4

The procedure of Example 1 was followed, with the exception that the feed consisted of a 50—50 weight percent mixture of 1,2-dichloroethane and 1,1,2-trichloroethane. The conversion to a mixture of vinyl chloride and vinylidene chloride was in excess of 80%, with only 20% being converted to cis- and trans- dichloroethylenes. No tars or polymers were produced.

Example 5

The procedure of Example 1 was followed, with the exception that 1,1,1-trichloroethane was employed as the feed. Conversion of the feed material to vinylidene chloride was in excess of 95% with no carbonization or tars being produced.

Example 6

The procedure of Example 5 was followed, with the exception that a 50—50 weight percent mixture of 1,1,1-trichloroethane and trichloroethylene was employed as the feed. Conversion of 1,1,1-trichloroethane to vinylidene chloride was almost quantitative; all of the trichloroethylene was recovered unchanged, and no tars or other byproducts were formed.

Example 7

The procedure of Example 1 was followed with the exception that 1,1,2,2-tetrachloroethane was employed as the feed. Conversion of the feed material to trichloroethylene was above 85%, and no other products were formed.

Example 8

The procedure of Example 1 was followed with the exception that the feed consisted of a 70–30 weight percent mixture of 1,1,2-trichloroethane and perchloroethylene. Essentially 100% of 1,1,2-trichloroethane was dehydrochlorinated to a 50—50 weight percent mixture of vinylidene chloride and cis- and trans- dichloroethylenes; all of the perchloroethylene was quantitatively recovered unchanged. The reaction was run continuously for in excess of 100 hours. There was no carbonization, tar formation or polymer formation in the catalyst bed or in the products. The vinylidene chloride and cis- and trans-dichloroethylenes were of such high purity that no subsequent rectification of the product was necessary.

The foregoing examples amply demonstrate the effectiveness of my catalyst in catalyzing dehydrochlorination of polychlorinated hydrocarbons to useful dehydrochlorinated products. The catalyst is inexpensive, durable and highly selective. When it is used essentially no undesirable tars or other polymers are formed during the dehydrochlorination reaction, and it has been found that it is not readily poisoned by the presence of known dehydrochlorination inhibitors. Comparative Example 2 also demonstrates the effectiveness of the catalyt in comparison with a variety of other known catalytic materials.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art and having the benefit of this disclosure otherwise than as specifically described and exemplified herein.

What is claimed is:

1. A method for the dehydrochlorination of 1,1,2-trichloroethane, which comprises contacting said 1,1,2-trichloroethane at a temperature of 300° to 600° C. with a rock salt catalyst having a particle size of 2 to 360 U.S. Standard Mesh, in the presence of between 0.0001 and 0.1 mole of chlorine as an initiator gas per mole of 1,1,2-trichloroethane.

2. The method of claim 1 in which the temperature is 400° to 500° C.

3. The method of claim 1 in which the rock salt has a particle size of 4 to 16 U.S. Standard Mesh.

References Cited

UNITED STATES PATENTS

| | | | |
|---|---|---|---|
| 2,378,859 | 6/1945 | Mugdan et al. | 260—654 D |
| 2,379,372 | 6/1945 | Mugdan et al. | 260—654 D |
| 2,588,867 | 3/1952 | Morris | 260—654 D |
| 2,803,678 | 8/1957 | Conrad | 260—656 |
| 2,875,255 | 2/2959 | Eberly | 260—656 |
| 2,957,923 | 10/1960 | Copelin et al. | 260—654 D |
| 3,299,152 | 1/1967 | Inaba et al. | 260—654 D |

LEON ZITVER, Primary Examiner

J. A. BOSKA, Assistant Examiner

U.S. Cl. X.R.

260—656 R